Patented May 18, 1943

2,319,393

UNITED STATES PATENT OFFICE 2,319,393

LUBRICANT FOR SOLID DIES

Samuel Epstein, Bethlehem, and John R. Kreiser, Lebanon, Pa., assignors to Bethlehem Steel Company, a corporation of Pennsylvania No Drawing. Application August 30, 1941, Serial No. 408,988

18 Claims. (Cl. 252—39)

This invention relates generally to the manufacture of wire, rods, bolts and the like, and more particularly to a dry powdered lubricant especially adapted for drawing and for forming such articles in cold heading dies.

In the manufacture of bolts and the like by the extrusion process, dry limed rods coated with a suitable lubricant are drawn through dies to proper wire size and later shaped and cold-headed in solid dies. Usually the lubricant is placed in the die box ahead of the drawing die, so that the lime-coated rod is covered with a film of lubricant before entering the die hole. The smooth glossy finish produced by a good lubricant saves the die edges, protects the wire from rust during shipment or storage, and assists in the subsequent heading operation in which the bolts are made.

For proper performance of these functions the lubricant should have the necessary lubricating qualities for drawing and extruding work, should be stable and resistant to deterioration under ordinary conditions, and should be dry and hard enough to flake readily off the wire so as not to clog the heading dies.

Among the most important properties of the lubricant is its melting point. If the melting point is too low the heat generated during drawing will make the lubricant sticky. It will then cake in the drawing die box and an excessively thick, dull-looking coating will form on the wire. During heading the lubricant will become sticky as a result of the heat generated by the cold heading and clog in the dies, this condition being aggravated by the thick coating on the wire. Moreover, when the lubricant melts its film strength falls, and the lubrication provided is not so good as when the lubricant is in the solid or incipiently plastic state.

If the melting point is too high, insufficient lubrication may be provided. With most of the common lubricants the friction during drawing is at a minimum when the lubricant is in the incipiently plastic state. If the melting point is too far above the temperature at the die box the incipiently plastic state will not be achieved, the powder will remain completely solid, and the friction will be higher. In this case the powder may act very "dry" during drawing, a good deal of the lime on the wire rod may be scraped off, the lubricating film formed is very thin, and the coating appears uneven an powdery with white streaks of lime showing through.

For maximum lubrication the melting point of the lubricant should be such that under the heat generated in the drawing and heading dies the incipiently plastic state is attained. Under most operating conditions this means that the lubricant should have a melting point somewhere near 275° F. As a result the lime on the rod is not scraped off but is evenly covered with lubricant, the coating has the proper thickness to provide ample lubrication, and it has a lustrous glossy sheen. It is not necessary that all of the lubricant have a melting point such that it will reach incipient fusion in the die box. A mixture may be used, composed of higher and lower melting point lubricants.

One object of this invention is, therefore, to provide a lubricant which will efficiently lubricate wire in drawing dies and extrusion dies.

Another object is to provide a hard dry powdered lubricant which will not clog in dies.

A further object is a lubricant which will remain stable and not decompose under changing conditions of heat and moisture.

Other objects, purposes and advantages of the invention will hereinafter appear in the specification and appended claims.

To provide adequate lubrication for extrusion in solid dies proper liming of the rod is an important preliminary. The rod must be heavily limed, the lime coating being applied by several dips in the lime tub. The rod should be thoroughly dried between each dip to obtain a uniformly adherent lime coating. The limed rod should then be baked to increase the adherence of the coating and for complete drying. Moist rods cannot be drawn properly as the lime is wiped off in the die, leaving shiny or bright spots without lime and hence with practically no lubrication. The lime coating provides the base for holding the lubricant. Unless there is a good lime coating, the lubrication will be insufficient for solid die extrusion work.

The lubricant of our invention comprises a mixture of 10 parts by weight of calcium myristate with about 5 to 7 parts of a suitable powdered wax or the wax-like compound having a high melting point.

Calcium myristate is the calcium salt of myristic acid. Because of its particular melting point (ca. 285° F.), it readily attains the incipiently plastic state favoring maximum lubrication without caking or sticking in the drawing or heading dies. In the proportion given, it forms about 60 to 67 per cent by weight of the mixture.

Also because of its melting point, the best wax generally for the purpose is a synethic wax known commercially as "Acrawax C" or cetyl acetamide, in powdered form, which in addition to excellent lubricating qualities has the high melting point, for wax, of 275° F. However, ozokerite, which melts at from 140° to 230° F., and montan or carnauba or like waxes, melting at or above 175° F., may be used efficiently, either as single waxes or combination of waxes, with calcium myristate. Waxes of still lower melting points, such as paraffin or beeswax, may only be used in suitably small proportions, not exceeding 10 to 15 per cent, in combination with waxes of higher melting points.

In actual wire drawing it has been found that these lubricant mixtures tend to cover the lime very evenly, so that the lubricating coating on the wire has a uniform continuous lime base, without any shiny bright streaks where the lime has been scraped off. The lubricant impregnated with the lime also has maximum lubricating properties. All these substances are water repellent and act as efficient rust protectants during shipment and storage. The wire retains well the sheen it has after drawing. The cost of the lubricant is about the same as that of previously used lubricants which are less effective.

In marketing such heading wire, especially adapted for solid die extrusion work, a distinctive identifying color may be given the wire by mixing with the lubricant about five (5) per cent of a dye material like burnt Turkey umber or India red, the former giving a brownish and the latter a pinkish color. However, these dyes are not lubricants and care should be taken that they are finely divided and well mixed with the lubricant so as not to increase die wear.

Bolts in which the neck must be filled out are generally made in split dies, but sometimes solid dies are used. For making such bolts in solid dies, better results will be obtained by adding to the lubricant about eight (8) per cent of calcium resinate. This will make the wire less slippery and hence will aid in filling out the neck. Ample lubricating value will remain for the extruding operations and for ease in kicking out.

While we have described our invention in considerable detail above, we do not wish to be limited to the exact and specific materials and methods described, but may use such substitutions, modifications or equivalents, as are embraced within the scope of the invention or are pointed out in the claims.

Having thus described our invention, what we claim as new and useful and desire to secure by Letters Patent is:

1. In the manufacture of wire, bolts and the like, the step consisting in drawing the limed wire rod through a suitable die with a lubricant consisting of calcium myristate and a wax of high melting point.

2. In the manufacture of wire, bolts and the like, the step consisting in drawing the limed wire through a suitable die with a lubricant consisting of a mixture of calcium myristate and a wax having a high point of incipient plasticity.

3. In the manufacture of wire, bolts and the like, the step consisting in drawing the limed wire through a suitable die with a lubricant consisting of a mixture of calcium myristate and calcium resinate and a wax having a high point of incipient plasticity.

4. In the manufacture of wire, bolts and the like, the step consisting in drawing the limed wire through a suitable die with a lubricant consisting of a mixture of calcium myristate and wax having a high melting point with a dye for coloring matter.

5. In the manufacture of wire, bolts and the like, the step consisting in drawing the limed wire through a suitable die with a lubricant consisting of a mixture by weight of approximately 10 parts of calcium myristate with 5 to 7 parts of cetyl acetamide.

6. In the manufacture of wire, bolts and the like, the step consisting in drawing the limed wire through a suitable die with a lubricant consisting of a mixture by weight of approximately 10 parts of calcium myristate with 5 to 7 parts of montan wax.

7. In the manufacture of wire, bolts and the like, the step consisting in drawing the limed wire through a suitable die with a lubricant consisting of a mixture by weight of approximately 60 to 67 per cent calcium myristate, 8 per cent calcium resinate, and the remainder cetyl acetamide.

8. A wire or rod drawing lubricant comprising a mixture of calcium myristate and a wax of high melting point.

9. A wire or rod drawing lubricant comprising a mixture of calcium myristate and a wax having a high point of incipient plasticity.

10. A wire or rod drawing lubricant comprising a mixture of calcium myristate and calcium resinate with a wax having a high point of incipient plasticity.

11. A wire or rod drawing lubricant comprising a mixture of calcium myristate and wax of high melting point with a dye for coloring matter.

12. A wire or rod drawing lubricant comprising a mixture by weight of about 10 parts of calcium myristate with 5 to 7 parts of cetyl acetamide.

13. A wire or rod drawing lubricant comprising a mixture by weight of about 10 parts of calcium myristate with 5 parts of cetyl acetamide.

14. A wire or rod drawing lubricant comprising a mixture by weight of approximately 10 parts of calcium myristate with 5 to 7 parts of montan wax.

15. A wire or rod drawing lubricant comprising a mixture by weight of approximately 10 parts of calcium myristate with 7 parts of montan wax.

16. A wire or rod drawing lubricant comprising a mixture by weight of approximately 10 parts of calcium myristate with 5 to 7 parts of carnauba wax.

17. A wire or rod drawing lubricant comprising a mixture by weight of approximately 60 to 67 per cent calcium myristate, 8 per cent calcium resinate, and the remainder a wax of high melting point.

18. A wire or rod drawing lubricant comprising a mixture by weight of approximately 60 to 67 per cent calcium myristate, 8 per cent calcium resinate, 5 per cent dye matter, and the remainder a wax of high melting point.

SAMUEL EPSTEIN.
JOHN R. KREISER.